No. 691,221. Patented Jan. 14, 1902.
C. M. WHEATON.
FRICTION CLUTCH.
(Application filed Aug. 17, 1901.)
(No Model.) 3 Sheets—Sheet 1.

Witnesses:
Walter C. Lombard
E. Batchelder

Inventor:
Carl M. Wheaton,
by Wright, Brown & Quinby
Attys.

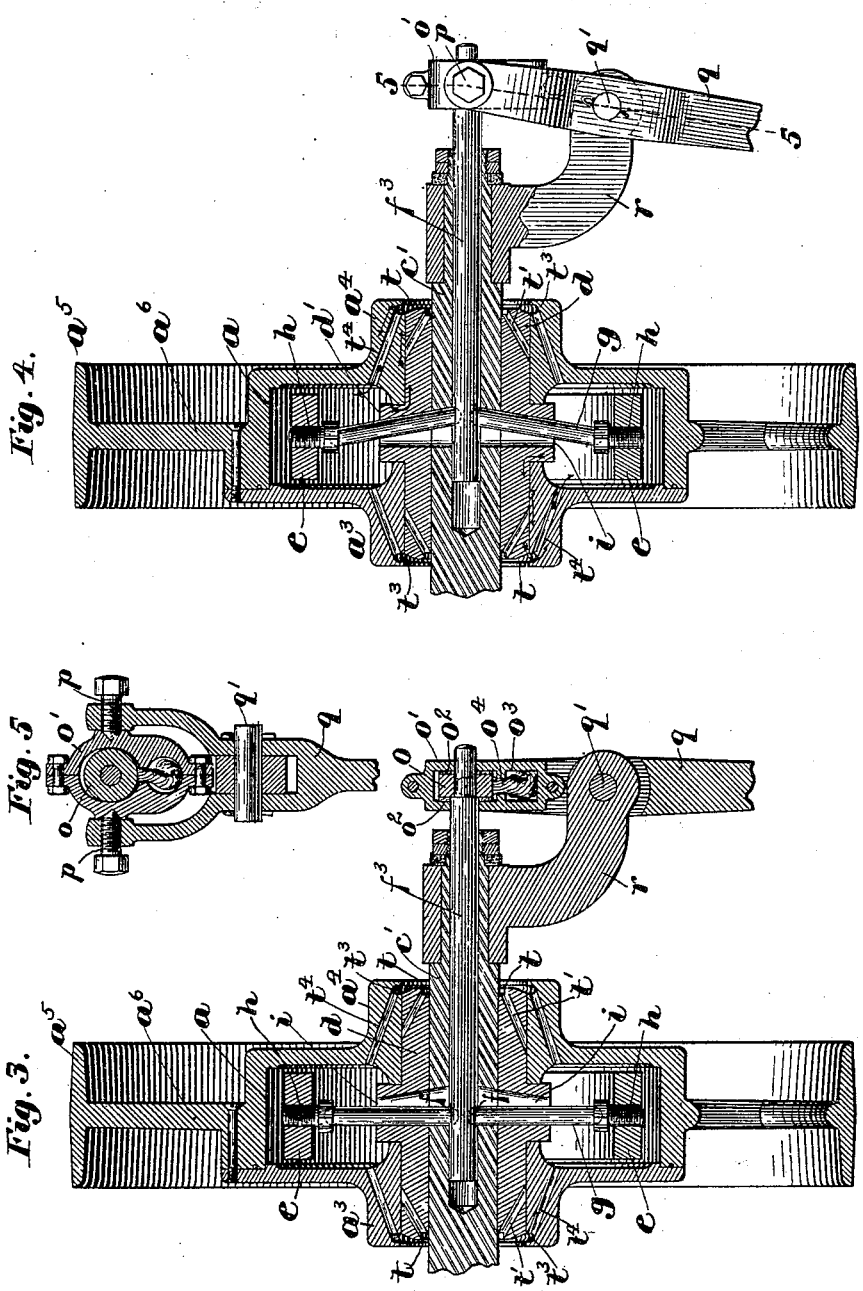

No. 691,221. Patented Jan. 14, 1902.
C. M. WHEATON.
FRICTION CLUTCH.
(Application filed Aug. 17, 1901.)
(No Model.) 3 Sheets—Sheet 3.
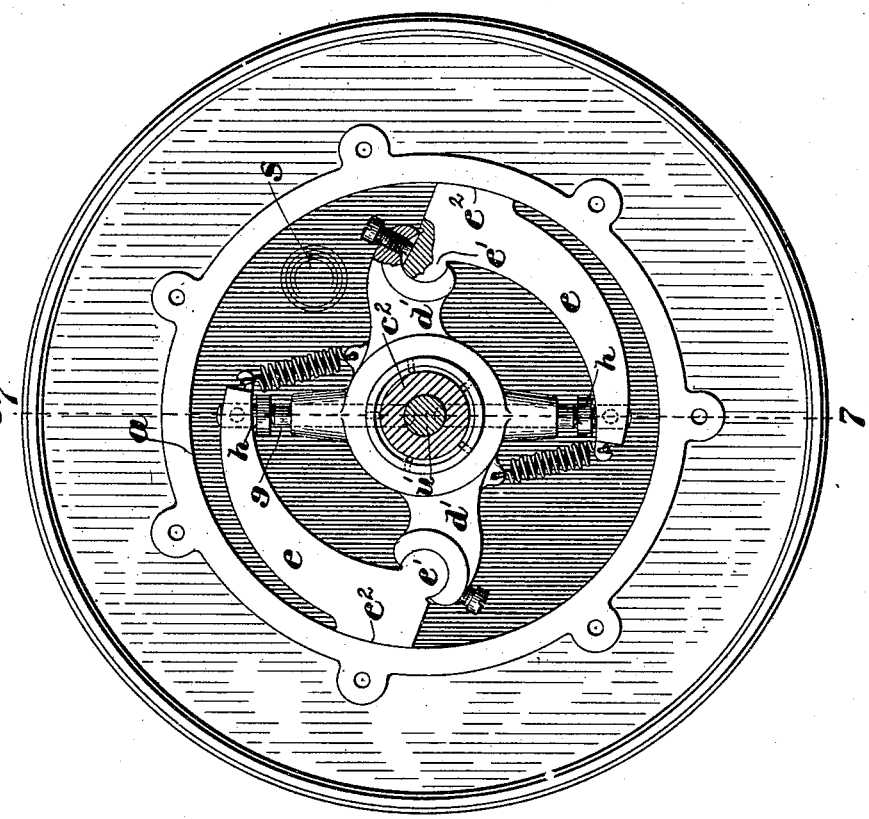
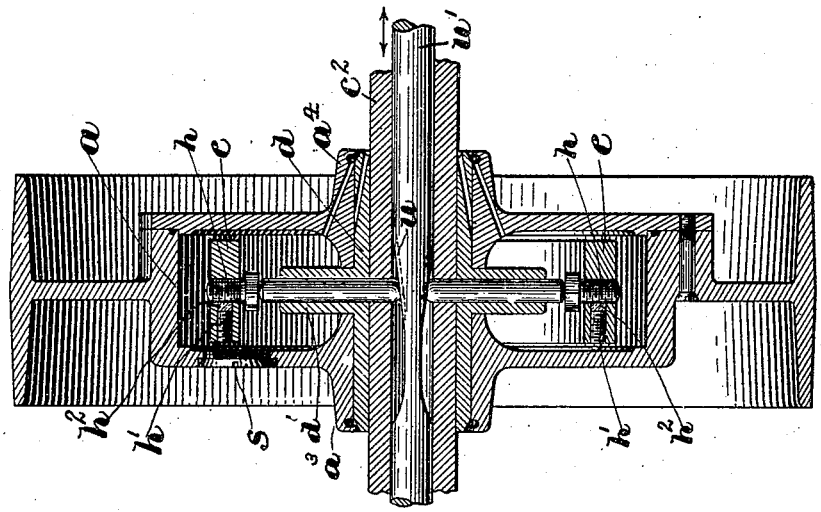
Witnesses:
Walter E. Lombard
E. Batchelder
Inventor:
Carl M. Wheaton,
by Wright Brown & Quinby
Attys.

UNITED STATES PATENT OFFICE.

CARL M. WHEATON, OF NEWTON, MASSACHUSETTS.

FRICTION-CLUTCH.

SPECIFICATION forming part of Letters Patent No. 691,221, dated January 14, 1902.

Application filed August 17, 1901. Serial No. 72,358. (No model.)

*To all whom it may concern:*

Be it known that I, CARL M. WHEATON, of Newton, in the county of Middlesex and State of Massachusetts, have invented certain new and useful Improvements in Friction-Clutches, of which the following is a specification.

This invention has for its object to provide a simple, durable, and automatically-lubricated friction-clutch for connecting members or parts of line-shafting or for connecting loose pulleys with the shafts on which they run.

The invention consists in the several improvements which I will now proceed to describe and claim.

Figure 1:
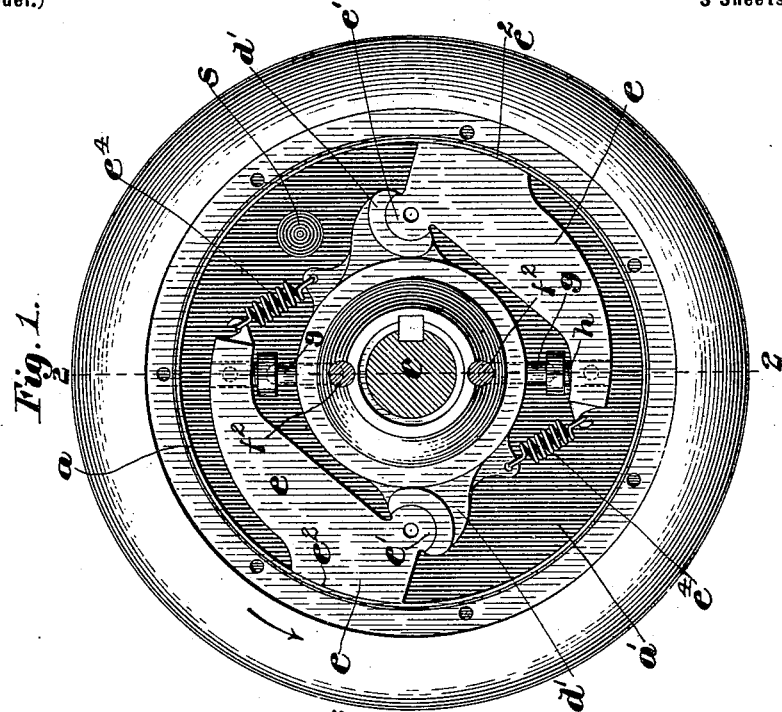
Figure 2:
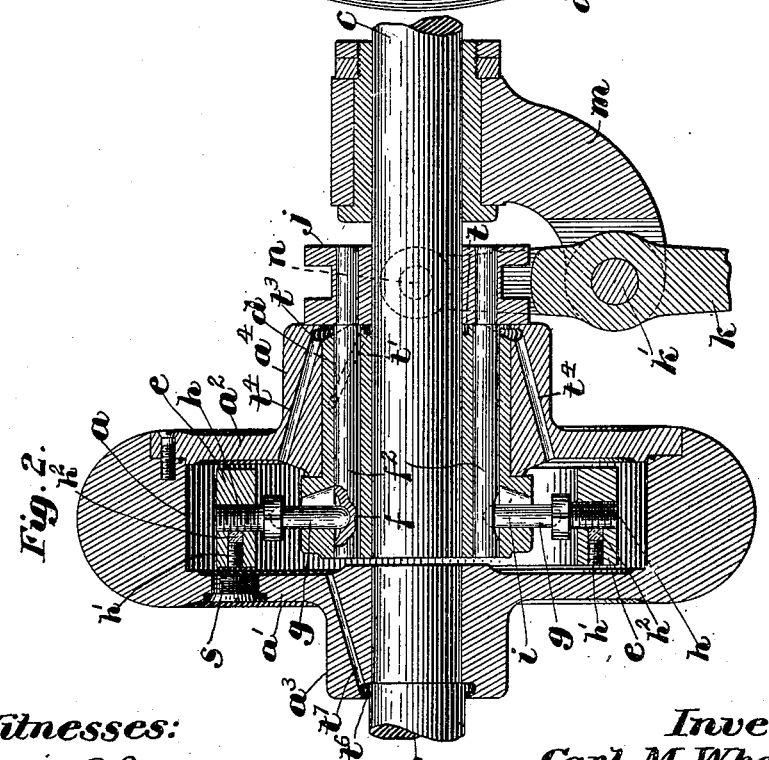

Of the accompanying drawings, forming a part of this specification, Figure 1 represents a side elevation of a clutch embodying my invention constructed to connect two members or sections of line-shafting, a portion of the outer member of the clutch being removed and the section of shafting on which the removed portion is located being shown in section. Fig. 2 represents a section on the line 2 2 of Fig. 1. Fig. 3 represents a sectional view showing my invention applied to a loose pulley and the shaft on which said pulley is mounted, the parts being shown in the position they occupy when the members of the clutch are engaged with each other. Fig. 4 represents a view similar to Fig. 3, showing the parts in the position they occupy when the clutch members are unclutched.
Fig. 5 represents a section on line 5 5 of Fig. 4. Fig. 6 represents a side elevation showing my invention applied to a loose pulley and the shaft which supports it, a portion of the outer member of the clutch being removed.
Fig. 7 represents a section on line 7 7 of Fig. 6.

The same reference characters indicate the same parts in all the figures.

I have shown three embodiments of my invention, each being a variation to meet different conditions. Figs. 1 and 2 show what I call the "outside" connection, adapted to use as a cut-off coupling or with the double hub as a main-line friction-pulley, the part hereinafter termed the "holder" in this instance furnishing a bearing for one of the hubs of the part called the "outer" member and securing perfect alinement of the two sections of shaft. Figs. 3 and 4 show what I call the "inside" or "central" connection, in which I use the toggle principle, the clutch members being engaged by pushing in the central rod or seat-carrier, which carries the struts, and unlocking by a reverse motion. This construction is used where continuous action is required, and infrequent operation, and secures a perfect lock which cannot jar loose. This can only be used near the end of a shaft, as is the case with the construction shown in Figs. 6 and 7, in which a wedge is employed for actuating the radial lifting pins or struts, which in this construction must be placed in holes but a trifle larger than the pins, as the walls must guide them.

The levers of the inner clutch member are cut away to form small bearing-surfaces running in a liberal supply of oil to prevent heavy pressure from causing abrasion. Bearings of equal length are provided on each side of the friction-chamber, around which the oil is automatically circulated, provision being made to prevent its escape. This equal bearing prevents unequal wear, which would occur if the bearings were at one side of the draft-line of the belt.

My improved clutch comprises an outer member, which is of annular form and has an internal circular friction-face $a$, which is concentric with the axis of the shaft or of the sections of shafting with which the clutch is used. In Figs. 1 and 2 the internal friction-face $a$ forms the inner surface of a hollow collar or casing surrounding two sections $b\ c$ of shafting. Said casing has two side pieces $a'\ a^2$, and said side pieces have hub portions $a^3\ a^4$, the hub portion $a^3$ being affixed rigidly to the shaft-section $b$, while the hub portion $a^4$ is mounted to rotate loosely upon a cylindrical holder $d$, which constitutes a part of the inner member of the clutch. In Figs. 3, 4, 6, and 7 the internal friction-face $a$ is the inner surface of the casing which forms part of a loose pulley, having a rim $a^5$ and arms or spokes $a^6$, connecting the rim with said casing. In the figures last mentioned the hub portions $a^3$ and $a^4$ are both journaled on the holder $d$ and are adapted to rotate freely thereon.

The inner member of the clutch includes the holder $d$, above referred to, said holder being loosely mounted on the shaft-section $c$ in the construction shown in Figs. 1 and 2 and rigidly affixed to the shaft-section $c'$ in the construction shown in Figs. 3 and 4 and to the shaft $c^2$ in the construction shown in Figs. 6 and 7. Said inner member includes, in addition to the holder $d$, a series of levers $e$, preferably two in number, said levers being fulcrumed to ears $d'$, formed on the holder $d$. Each lever $e$ has a fulcrum-boss $e'$ formed on what I shall hereinafter term the "inner" end of the lever, said boss fitting a corresponding socket in the accompanying arm $d'$. Each lever $e$ has a friction-face $e^2$ extending from its inner end partly to its outer end and formed to coöperate with the internal friction-face $a$. The friction-face $e^2$ of each lever is much shorter than the total length of the lever, its length being preferably from about one-fifth to about one-third of the total length of the lever. By making the friction-faces of the levers thus relatively short and locating them at the inner or fulcrumed ends of the levers I reduce the contacting surface of each lever to a relatively small area, and thereby give said contacting surface a correspondingly-increased clinging power when it is pressed against the internal friction-face $a$ by the means hereinafter described. This small area of contacting surface would cause abrasion and rapid wear of the friction-surfaces were it not for the fact that means are provided, as hereinafter described, for thoroughly lubricating said surfaces, the internal surface $a$ being, in fact, the outer wall of an oil-chamber, the other walls or surfaces of which are formed by the side pieces and hub portions of the casing.

The means employed for forcing the outer ends of the levers $e$ outwardly to engage the friction-surfaces comprise in the construction shown in Figs. 1, 2, 3, and 4 sliding seats or socket-shaped steps $f$, formed on a step-carrier which is movable longitudinally of the holder $d$. In Figs. 1 and 2 I show a two-part step-carrier composed of two cylindrical members $f^2 f^2$, fitted to move in a corresponding two-part guide in the holder $d$. Said means also comprise struts $g\ g$, interposed between said steps $f$, and socket-shaped seats formed in the heads of screws $h$, engaged with the outer end portions of the levers $e$. In the construction shown in Figs. 3 and 4 the two steps $f$ are formed in a one-part carrier $f^3$, which is fitted to move in a guide formed for its reception in the shaft $c'$. Said shaft is rigidly secured to the holder $d$, so that as a guide for the carrier $f^3$ it may be considered as a part of the holder. By reference to Fig. 4 it will be seen that the struts $g$ are adapted to swing and occupy positions substantially at right angles to the axis of rotation, as shown in Fig. 3, or positions inclined to said axis, as shown in Fig. 4. When the struts are moved to the position shown in Fig. 3, they force the levers $e$ outwardly, the arrangement preferably being such that the inner ends of the struts are slightly at the left of a line drawn from the center of the outer end of one strut to the center of the outer end of the other strut, the two struts being at diametrically opposite sides of the axis of rotation. This arrangement causes the struts to be locked in their clutch-engaging position with sufficient firmness to prevent their accidental displacement and at the same time permits them to be easily displaced to the position shown in Fig. 4, which is the position they occupy when the clutch members are unclutched. The holder $d$ is provided with radial strut-guides $i$, which are enlarged at their inner ends to permit the struts to slant or occupy the inclined position in Fig. 4 when the clutch members are unclutched.

Means are provided for moving the seats $f f$ to cause the struts to assume the different positions shown in Figs. 3 and 4. In Fig. 2 the means for moving the seats $f$ comprise a collar $j$, surrounding the shaft $c$ and loosely mounted thereon, the outer ends of the members $f^2$ of the two-part seat-carrier being affixed rigidly to said collar, and a forked shipper-lever $k$, fulcrumed at $k'$ to a fixed arm or bracket $m$, the forked end of said lever having studs $n$, which engage a groove in the periphery of the collar $j$, so that when the lever $k$ is moved the collar $j$ is also moved and imparts motion to the seat-carrier $f^2 f^2$. In the construction shown in Figs. 3 and 4 the one-part carrier $f^3$, containing the seats $f f$, is engaged at its outer end with a disk $o$, which is contained in an opening formed in a yoke $o'$, which is connected by pivot-screws $p\ p$ with the forked end of a shipper-lever $q$, pivoted at $q'$ to an arm or bracket $r$, mounted loosely on the shaft $c'$. The disk $o$ rotates with the carrier $f^3$, and to prevent wear of the disk I interpose between its sides and the sides of the opening in the yoke $o'$ washers $o^2 o^2$, of vulcanized fiber or other like material, and supply oil to the said disk and washers by means of an oil-chamber $o^3$ in the yoke and a wick $o^4$, extending from said chamber to the periphery of the disk.

It will be observed that the swinging connection between the ends of the struts $g$ and the seats on which they bear enables the said struts to be moved to connect and disconnect the clutch members with the minimum of frictional resistance. The arrangement of the struts at diametrically opposite sides of the axis so balances the pressure that the friction on the two-part carrier $f^2 f^2$ or the single carrier $f^3$ is reduced to the minimum. The seat-carrier is in each case snugly fitted in its guide, so that it cannot be removed laterally. Hence there can be no inward yielding of the seats $f$ under the pressure of the struts against them. The seats are independent of each other, so that each firmly supports the strut which bears upon it.

The screws $h$, in which are formed the seats or steps for the outer ends of the struts $g$, are adjustable to compensate for wear of the friction-surfaces. Each screw $h$ is preferably locked against accidental rotation by a set-screw $h'$ and a plug $h^2$, of relatively yielding material, interposed between the inner end of the set-screw and the thread of the screw $h$ to prevent the pressure of the set-screw from marring the thread of the screw $h$. Access may be had to the screws $h$ and $h'$ through an opening in one side of the oil-chamber, said opening being normally closed by a screw-plug or closure $s$ and serving also to admit oil to said chamber. The said opening is in the outer portion of the chamber, so that when the chamber is turned to bring the opening to the upper portion the chamber can be opened without loss of oil.

It will be seen that the holder $d$ has in each of the above-described constructions an enlargement $d'$, which projects into the oil-chamber. In the construction shown in Fig. 2 one side of said enlargement forms a shoulder that bears against the inner end of the hub portion $a^4$, while in the construction shown in Figs. 3, 4, and 7 each side of the enlargement forms a shoulder, one bearing against the hub portion $a^4$ and the other against the hub portion $a^3$. The oil in the chamber comes in contact with the said enlargement and finds its way between said shoulders and the ends of the hub portions and from thence outwardly between the periphery or bearing-surface of the holder $d$ and the internal surfaces of the hub portions and thoroughly lubricates said surfaces. In the outer ends of the said hub portions are formed annular grooves $t^3$, which communicate with inclined ducts $t^4$, formed in the hub portions. The surplus oil which finds its way to the outer ends of the hub portions is carried by centrifugal force through the said inclined ducts back to the oil-chamber, a circulation of oil being thus maintained. Annular grooves $t$ are preferably formed in one or both ends of the holder $d$, and inclined ducts $t'$ extend from the grooves $t$ to the periphery of the holder $d$, so that any oil which may find its way inwardly from the grooves $t^3$ is carried by centrifugal force to the periphery of the holder. In the construction shown in Fig. 2, in which the hub portion $a^3$ is affixed to the shaft-section $b$ and does not bear on the holder $d$, an end groove $t^6$ and inclined ducts $t^7$ are formed in said hub portion, their object being to permit the supply of oil to be replenished while the clutch members are engaged and in motion, the oil being inserted in the groove $t^6$ and conducted from thence to the oil-chamber through the inclined ducts $t^7$. The end grooves $t$ and inclined ducts $t'$ in the holder $d$ may be utilized in the same way for supplying oil to the bearing-surface or periphery of the holder. When the clutch members are engaged, all parts move together and need no lubrication; but when the clutch members are disengaged and one is rotating while the other is stationary the parts in wearing contact—viz., the external surface of holder $d$ and the internal surface of the hub portion or portions rotating thereon—need lubrication. In case the holder $d$ stands still while the outer member rotates the moving part dashes the oil over the stationary part. The oil-chamber communicates with the crevice between the holder or bearing $d$ and the hub portion or portions, so that oil runs along said crevice to the annular grooves $t^3$ and from thence is carried by centrifugal force back to the chamber through the inclined ducts $t^4$, the course of the oil being as indicated by the arrows above the shaft in Fig. 4. This action is continuous so long as the outer member runs loosely. In case the outer member stands still and the holder $d$ with the shaft revolves the order is reversed—the oil is dashed upon the walls of the friction-chamber, finds its way along the bearing to the annular grooves $t^3$, and from thence by gravity back through the inclined ducts in the lower sides of the hub portions to the chamber, the course of the oil being as indicated by the arrows below the shaft in Fig. 4. It will be seen that the oil-chamber is closed to prevent the centrifugal escape of oil therefrom, so that a charge of oil will last indefinitely, there being practically no waste of oil.

In the construction shown in Figs. 6 and 7 the struts $g$ are moved radially out and into connect and disconnect the clutch members by means of inclined seats $u$, formed on an operating slide or rod $u'$. This construction is adapted for use in connection with a counter-shaft, which is indicated by $c^2$.

The levers $e$ are retracted or swung inwardly to disconnect the clutch members by means of springs $e^4$, Fig. 1, connected with the outer ends of the levers and with ears on the holder $d$. Said springs maintain an operative connection between the struts and the seats or steps. In the line-shafting-coupling construction shown in Figs. 1 and 2 the holder $d$, forming a part of the inner member of the clutch and forming a bearing for one of the hub portions of the outer member, is held by the outer member in position to insure the alinement of the two sections $b$ and $c$ and the proper relative positions of the friction-faces $a$ and $e^2$.

I claim—

1. A clutch comprising an outer member having an internal friction-face, and annular sides provided with hub portions, said friction-face and sides constituting an oil-chamber which is closed to prevent the centrifugal escape of oil therefrom, an inner member including, first, a holder surrounded by said outer member, and constituting a bearing upon which the outer member is adapted to rotate, and secondly, levers fulcrumed at their inner ends on said holder and having relatively short friction-faces formed to engage said internal face, and means for exerting outward pressure on the outer ends of the levers to engage their friction-faces with the internal face of the outer member, said chamber being adapted to contain a body of oil which is distributed without waste over said friction-faces.

2. A clutch comprising an outer member having an internal friction-face, and annular sides provided with hub portions, said friction-face and sides constituting an oil-chamber which is closed to prevent the centrifugal escape of oil therefrom, an inner member including, first, a holder surrounded by said outer member, and constituting a bearing upon which the outer member is adapted to rotate, and secondly, levers fulcrumed at their inner ends on said holder and having relatively short friction-faces formed to engage said internal face, means for exerting outward pressure on the outer ends of the levers to engage their friction-faces with the internal face of the outer member, and means for maintaining an automatic circulation of oil from the chamber along the said bearing and from the bearing back to the chamber.

3. A clutch comprising an outer member having an internal friction-face, and annular sides provided with hub portions, said friction-face and sides constituting an oil-chamber which is closed to prevent the centrifugal escape of oil therefrom, an inner member including, first, a holder surrounded by said outer member, and constituting a bearing upon which the outer member is adapted to rotate, and secondly, levers fulcrumed at their inner ends on said holder and having relatively short friction-faces formed to engage said internal face, means for exerting outward pressure on the outer ends of the levers to engage their friction-faces with the internal face of the outer member, said chamber communicating with the said bearing, so that oil can pass from the chamber to and along the bearing, and inclined ducts extending from the bearing back to the chamber whereby oil may be returned from the bearing to the chamber.

4. A clutch comprising an outer member having an internal friction-face, and annular sides provided with hub portions, said friction-face and sides constituting an oil-chamber which is closed to prevent the centrifugal escape of oil therefrom, an inner member including, first, a holder surrounded by said outer member, and constituting a bearing upon which the outer member is adapted to rotate, and secondly, levers fulcrumed at their inner ends on said holder and having relatively short friction-faces formed to engage said internal face, means for exerting outward pressure on the outer ends of the levers to engage their friction-faces with the internal face of the outer member, said chamber communicating with the said bearing, so that oil can pass from the chamber to and along the bearing, and oil-circulating means comprising an annular end groove formed in the outer end of said hub portion and overhanging the outer end of the bearing, and inclined ducts extending from said groove to the interior of the oil-chamber.

5. A clutch comprising an outer member having an internal friction-face, an inner member including, first, a holder formed as a bearing on which the hub portion of the outer member is journaled, and secondly, levers fulcrumed on said holder and having friction-faces formed to engage said internal face, means for exerting outward pressure on said levers to engage their faces with the face of the outer member, the said outer member forming an oil-chamber surrounding the holder, and oil-circulating means comprising annular end grooves formed on the holder and in the hub portion of the outer member, and two series of inclined ducts, one series extending from the end grooves in the holder to the periphery of the holder, while the other series extends from the end groove of the hub portion to the interior of the said oil-chamber.

6. A clutch comprising an outer member having a friction-face, and annular side members provided with hub portions, an inner member including, first, a holder surrounded by said outer member and constituting a bearing upon which the outer member is adapted to rotate, said inner member having radial strut-guides and a longitudinally-extending seat-carrier guide, and secondly, levers fulcrumed at their inner ends on the holder and having friction-faces formed to engage said internal face, and lever-operating mechanism including a seat-carrier fitted to move longitudinally in said seat-carrier guide, and held thereby against lateral movement, said carrier having a plurality of independent seats coinciding with said strut-guides, struts interposed between said seats and the outer ends of the levers, said struts passing through the strut-guides, and means for moving the seats to cause the struts to actuate and release the levers.

7. A clutch comprising an outer member having a friction-face and annular side members provided with hub portions, said friction-face and sides constituting an oil-chamber which is closed to prevent the centrifugal escape of oil, an inner member including, first, a holder surrounded by said outer member and constituting a bearing upon which the outer member is adapted to rotate, and secondly, levers fulcrumed at their inner ends on said holder and having friction-faces formed to engage said internal face, and adjustable seats or steps at their outer ends, and lever-operating mechanism including sliding seats located within the holder, and struts interposed between said seats and the adjustable seats or steps on the levers, the outer portion of said chamber having an opening arranged to permit access to said adjustable seats, and a detachable plug or closure for said opening whereby the chamber may be opened to permit adjustment of the adjustable seats without loss of oil therefrom.

8. A clutch comprising an outer member having a friction-face, and annular sides provided with hub portions one of which is adapted for attachment to a section of shafting while the other is internally enlarged, an inner member including, first, a holder surrounded by said outer member and by the internally-enlarged hub portion thereof, and constituting a bearing upon which said enlarged hub portion is adapted to rotate, and secondly, levers fulcrumed at their inner ends on the holder and having friction-faces formed to engage said internal face, and longitudinally-movable seats or steps supported and guided by said holder, struts interposed between said seats and the outer ends of the levers, and means for moving said seats, the said holder being internally formed to receive and rotate loosely upon another section of shafting which is held by the said outer member and holder in alinement with the first-mentioned section.

9. A clutch comprising an outer member having an internal friction-face, an inner member including, first, a holder surrounded by said outer member, and secondly, levers fulcrumed at their inner ends on the holder and having friction-faces formed to engage said internal face, a slide movable within the holder and having strut seats or steps, struts interposed between said seats and the levers, and a shipper-lever having a yoke engaged with a collar on said slide, and means for lubricating the contacting surfaces of the collar and yoke.

10. A friction-clutch comprising an outer member having an internal friction-face and a hub, an inner member including, first, a holder forming a bearing for said hub, and secondly, levers fulcrumed on the hub and having relatively short friction-faces at their inner ends adapted to engage the friction-face of the outer member, struts bearing on the outer ends of said levers and extending therefrom into the said holder, and strut-actuating means located within the holder.

In testimony whereof I have affixed my signature in presence of two witnesses.

CARL M. WHEATON.

Witnesses:
  C. F. BROWN,
  E. BATCHELDER.